United States Patent
Kwak et al.

(10) Patent No.: US 7,853,592 B2
(45) Date of Patent: Dec. 14, 2010

(54) SYSTEM AND METHOD OF SEARCHING FOR PREVIOUSLY VISITED WEBSITE INFORMATION

(75) Inventors: Yong Jae Kwak, Seoul (KR); Se Jin Cheon, Seoul (KR); Tae Hyeon Park, Seongnam-si (KR); Sungwon Kim, Seoul (KR); Jang Won Seo, Seoul (KR); Beom Seok Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 274 days.

(21) Appl. No.: 11/584,231

(22) Filed: Oct. 20, 2006

(65) Prior Publication Data
US 2007/0094243 A1    Apr. 26, 2007

(30) Foreign Application Priority Data
Oct. 20, 2005    (KR)    .................... 10-2005-0098997

(51) Int. Cl.
G06F 7/00    (2006.01)
G06F 17/30    (2006.01)
(52) U.S. Cl. .................................... 707/736
(58) Field of Classification Search ................ 715/234; 709/224; 707/662, 703, 736
See application file for complete search history.

(56) References Cited
U.S. PATENT DOCUMENTS

| | | | | |
|---|---|---|---|---|
| 6,189,024 B1 * | 2/2001 | Bauersfeld et al. | .......... | 709/203 |
| 6,310,630 B1 * | 10/2001 | Kulkarni et al. | ............. | 715/776 |
| 6,460,060 B1 * | 10/2002 | Maddalozzo et al. | ........ | 715/234 |
| 6,667,751 B1 * | 12/2003 | Wynn et al. | .................. | 715/833 |
| 6,707,470 B1 * | 3/2004 | Sashihara | .................... | 715/745 |
| 7,093,012 B2 * | 8/2006 | Olstad et al. | ................. | 709/224 |
| 2004/0267815 A1 * | 12/2004 | De Mes | .................... | 707/104.1 |

FOREIGN PATENT DOCUMENTS

KR    10-2001-0073873 A    8/2001

OTHER PUBLICATIONS

An Office Action dated May 1, 2006 from Korean Patent Application No. 10-2005-0098997.

* cited by examiner

*Primary Examiner*—Greta L Robinson
*Assistant Examiner*—Jeffrey Chang
(74) *Attorney, Agent, or Firm*—H.C. Park & Associates, PLC

(57) ABSTRACT

A visited website search system searching a website visited by a user. The visited website search system searching the website visited by the user includes: a mini web server installed in the local computer, receiving a search command with respect to data in the local computer from a web browser according to an HTTP protocol and providing a search result in a web document to the web browser; a searcher generating a search result by searching a website, corresponding to an query included in the search command, among the website visited by user and a web document generator generating the search result in the web document. Accordingly, the visited website by the user may be stably searched according to the HTTP protocol, similar to a web search.

20 Claims, 7 Drawing Sheets

SYSTEM AND METHOD OF SEARCHING FOR PREVIOUSLY VISITED WEBSITE INFORMATION

CROSS-REFERENCE TO RELATED APPLICATION

This application claims priority from Korean Patent Application No. 10-2006-0098997, filed on Oct. 20, 2005, in the Korean Intellectual Property Office, the entire disclosure of which is incorporated herein by reference.

BACKGROUND OF THE INVENTION

1. Field of the Invention

The present invention relates to a search system. More particularly, the present invention relates to a visited website search system searching a website visited by a user and a method using the system.

2. Description of Related Art

Due to development of Internet, web search services are generally used to effectively search massive amounts of data on Internet. The web search services automatically traverses a hypertext structure of a web by using a web robot, automatically searches referred documents, and indexes the referenced documents. Users access a web search service site via the Internet and input a keyword, thereby searching for desired information such as web documents, from an indexed database.

As storage space of personal computers, such as desktop and notebook computers, becomes increasingly larger and many files including documents, images, mails, messenger dialogue contents, moving pictures, and music can be stored in the storage space of the desktop or notebook computers, the necessity of searching a local computer, with respect to data in the desktop or notebook, increases in addition to conducting a web search.

For example, when a user of a desktop computer had described his impression about a movie whose title is "island" by using a word processor and wants to find the described impression after several years have passed, the user has to remember exactly which directory a corresponding file is stored and the name of the file to find the described impression of "island" stored within the computer of the user. However, it is often difficult for the user to remember the directory and the file name of all files, such as documents.

Even when not precisely remembering which directory a particular file is stored in, when knowing a file name or a character sequence included in the contents of the file, a user may locate a desired file by using a function of searching for a file, provided by an operation system (OS). However, the function of searching for a file, provided by the OS, takes long time due to searching information in a computer of the user in real time. Because of an ever increasing capacity of storage space, such as a hard disk, of a computer, inconvenience gradually increases.

To solve the inconvenience, a desktop search service has been provided. In the desktop search service, when a user inputs a keyword via a deskbar, a toolbar, or a web browser window, information in a computer of the user, associated with the keyword, is searched for. The desktop search helps the users to locate desired information easily by enabling such information in the computer of the user to be searchable and reduces burden of manually arranging files, emails, and bookmarks.

However, in a conventional desktop search service, a desktop search result is generated by intercepting a desktop search command in a web browser by changing or updating a network system file provided by an OS, such as a socket dynamic link library (DLL), and is transmitted to the web browser via the changed network system file.

Accordingly, in the convention desktop search service, when a certain file such as "winsock.dll" is changed or another DLL file associated with the certain file such as "winsock.dll" is changed by the OS or other applications, an error such as a corrupted appearance when accessing a certain website occurs, and operations are unstable. Generally, since the OS or application programs may be frequently updated and the socket DLL or a system DLL on which the conventional desktop search service depends may be changed whenever performing an update, the conventional desktop search service includes a risk of generating an error at any time due to an update of the OS or other applications.

In addition to the conventional desktop search service, as a type of a desktop search service, a visit website search service with respect to a website visited by the user has been introduced. Namely, a corresponding website may be revisited, or information of the visited website may be obtained since a website associated with the inputted keyword among websites visited by the user is provided to the user as a search result by inputting an associated keyword, i.e. when the user inputs a keyword, without remembering a precise address of the visited website.

As described above, there have been various methods to effectively implement the visited website search system in the conventional art, however a service is not stable, and costs for building a system is great and maintain/repair for the system is difficult since the implementing is complicated in the conventional art.

Accordingly, a visit website search service system searching a website visited by a user and a method using the system which can stably operate and effectively provide a keyword search service search with respect to the user's website visit history, using the HTTP protocol, is earnestly requested.

SUMMARY OF THE INVENTION

An aspect of the present invention provides a local computer search system and a local computer search method operating based on a web server to stably operate according to the HTTP protocol similar to a general website search.

An aspect of the present invention also provides a visited website search service system searching a website visited by a user capable of being easily compatible with a general web search system by using the HTTP protocol, and has an interface identical with a general web search service.

The present invention also provides a visited website search service system searching a website visited by a user which can easily and effectively collect a user's website visit history by monitoring a web browser using a browser helper object.

The present invention also provides a visited search service system searching a website visited by a user which can simply index a user's website visit history using a polling method, can reduce a load of a system, and can effectively operate.

The present invention also provides a visited website search service system searching a website visited by a user which can reduce a load of a central processing unit (CPU) of a local computer by operating using an additional timer which is included in a CPU chipset of the local computer when accessing a website history database within a predetermined time.

The present invention also provides a visited website search service system searching a website visited by a user which can reduce indexing and collecting operations with respect to unnecessary information of a visited website since information of a website visited by a user is not updated when the user revisits the website within a predetermined time period.

An aspect of the present invention also provides a visited website search service system searching a website visited by a user capable of efficiently generating a view by including an additional resource component providing a resource required in generating the view provided to a user via a web browser when a language or a font is changed.

According to an aspect of the present invention, there is provided a visited website search system searching a website visited by a user including: a mini web server established in a local computer, receiving a search command for the website visited by the user from a web browser according to the HTTP protocol, and providing the web browser with a web document type search result; a search unit generating a search result by searching a website, corresponding to a query which is included in the search command, among the website visited by user; and a web document generation unit transforming the search result to the web document type search result.

In this case, the visited website search system searching the website visited by the user is embodied using a browser helper object (BHO), and further comprises a website visit monitoring unit monitors the user's website visit and stores information of the user's website visit.

In this case, the BHO does not operate limited to Internet Explorer of Microsoft Corporation. Namely, a program module expanding a function of a web browser may be included in the BHO a web browser, regardless of its name.

According to another aspect of the present invention, there is provided a website visited search method searching a website visited by user including: receiving search command for the website visited by user from a web browser according to the HTTP protocol by a mini web server established in a local computer; generating a search result by retrieving a website, corresponding to a query which is included in the search command, from among the website visited by user; generating the search result of the web document type by transforming the search result into a web document type; and providing the web browser with the search result of the web document type, by the mini web browser.

In this case, the local computer includes all apparatuses including a microprocessor and a storage device, such as a desktop computer, a notebook computer, a laptop computer, a personal digital assistant (PDA), a mobile phone, and an MP3 player. In this case, the storage device may be a hard disk, a RAM, or a ROM and may be a built-in device or external device.

In addition, the local computer may be a concept including a plurality of computers connected via a local-area network (LAN).

In this case, communication between a web browser and a mini web server may be performed by using a loopback interface but may not permit an external access to the mini web server.

BRIEF DESCRIPTION OF THE DRAWINGS

The above and other aspects and advantages of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS OF THE INVENTION

Figure 1:
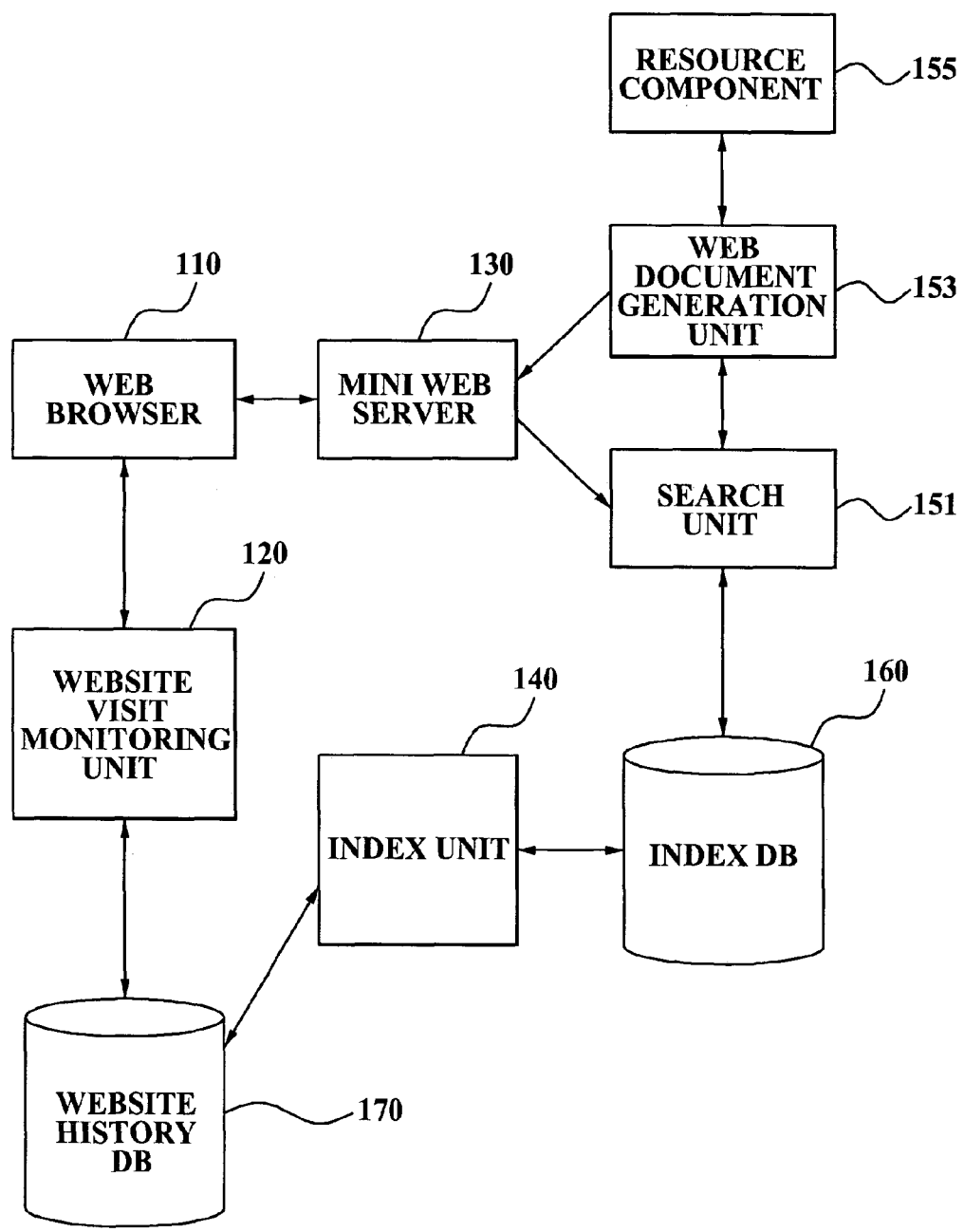
FIG. 1 is a block diagram illustrating a website search system searching a website visited by a user according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a block diagram illustrating a website search system searching a website visited by a user according to an exemplary embodiment of the present invention.

Referring to FIG. 1, the website search system according to the exemplary embodiment of the present invention includes a web browser 110, a website visit monitoring unit 120, a mini web server 130, an index unit 140, a search unit 151, a web document generation unit 153, a resource component 155, an index database 160 and a website history database 170.

The web browser 110 is software enabling various information, taken from a web server while a computer of a user is connected to Internet, to be shown. For example, the web browser 110 may be Internet Explorer of Microsoft Corporation, Netscape Browser of Netscape Communications Corporation, or Firefox of Mozilla Corporation. The web browser 110 includes all types of program modules which receives a keyword from a user and transmits the received keyword via the HTTP protocol to the mini web server 130, including a general web browser.

The web browser 110 provides an input interface for receiving a search command from a user and displays a search result in the form of a web document to the user.

The input interface may correspond to a general input interface for searching a web. Namely, the web browser 110 enables that the user inputs a keyword in the same way as a method of using a general input interface for searching the web and establishes search objects as a visit website search.

When the user requests a search with respect to data stored in a local computer, the web browser 110 may establish a destination address of the search command to be an address of a local computer in which the web browser 110 is installed, or a loopback address.

The search result in the form of the web document may be a hypertext markup language (HTML) document. In this case, the search result in the form of the web document may be a visit website search result to which a required image or phrase is included. The web browser 110 reads and displays the search result in the form of an HTML document on the screen.

The website visit monitoring unit 120 is embodied in a BHO type, monitors the user's website visit and stores information of the user's website visit. In this case, the BHO is a type of a plug-in module, the form of a dynamic link library (DLL), which is utilized for expanding a function of the web browser 110, and performed by the web browser 110. The BHO may be advantageously utilized to monitor the user's entire web accesses occurring while the local computer's operates since it is automatically executed when booting up Windows™.

In this case, the website visit monitoring unit 120 monitors the user's website visit via the web browser 110 by expanding the function of the web browser 110, collects a history of the user's website visit via the web browser 110, and stores the history of the user's website visit in a website history database 170. In this case, the website visit history may include information contained in a corresponding website for every website the user has visited. As an example, the website visit history may include at least any one of a visited website uniform resource locator (URL), a visited website title, the text type HTML source, and a thumbnail image of a browser snapshot.

The website visit monitoring unit 120 parses the HTML source of the visited website to extract a text type HTML source in the collecting the website visit history.

TABLE 1

| site 1 | URL1 | title 1 | HTML1 | thumbnail 1 |
| site 2 | URL2 | title 2 | HTML2 | thumbnail 2 |
| site 3 | URL3 | title 3 | HTML3 | thumbnail 3 |
| site 4 | URL4 | title 4 | HTML4 | thumbnail 4 |

Table 1 is an example of data stored in the website history database 170.

As illustrated in the Table 1, the visited website URL, the visited website title, the text type HTML source, and the thumbnail image of a browser snapshot may be stored in each field within the website history database 170 whenever the user visits a new website.

The website visit monitoring unit 120 registers the website visit history when not storing the website visit history, and may not store the website visit history when the user visits a website that is registered in a blacklist. As described above, a visit history for an unnecessary site may be excluded from the visit website search result by registering the unnecessary site in the blacklist.

Also, the website visit monitoring unit 120 may not record a website visit history when the user revisits an identical website within a predetermined period of time.

As an example, the website visit monitoring unit 120 may not record the website visit history when the user revisits the same website within seven days. In this case, when the user accesses website A and the website visit monitoring unit 120 records the website visit history, and when the user revisits the website A within five days, the website visit monitoring unit 120 does not update the website visit history which in effect does not record the website visit history. When the user accesses the website A and the website visit monitoring unit 120 records the website visit history, and when the user revisits the website A after nine days, the website visit monitoring unit 120 may record the website visit history by updating the website visit history.

It is not effective to store the website visit history whenever the user visits the user's favorite websites since the user tends to have several favorite websites to frequently visit. Subsequently, a system resource for updating the website visit history may be conserved through elimination of an unnecessary updating of the website visit history by establishing to not record the website visit history, with respect to a revisit within a predetermined period, in consideration of an updating period of the websites.

Figure 2:
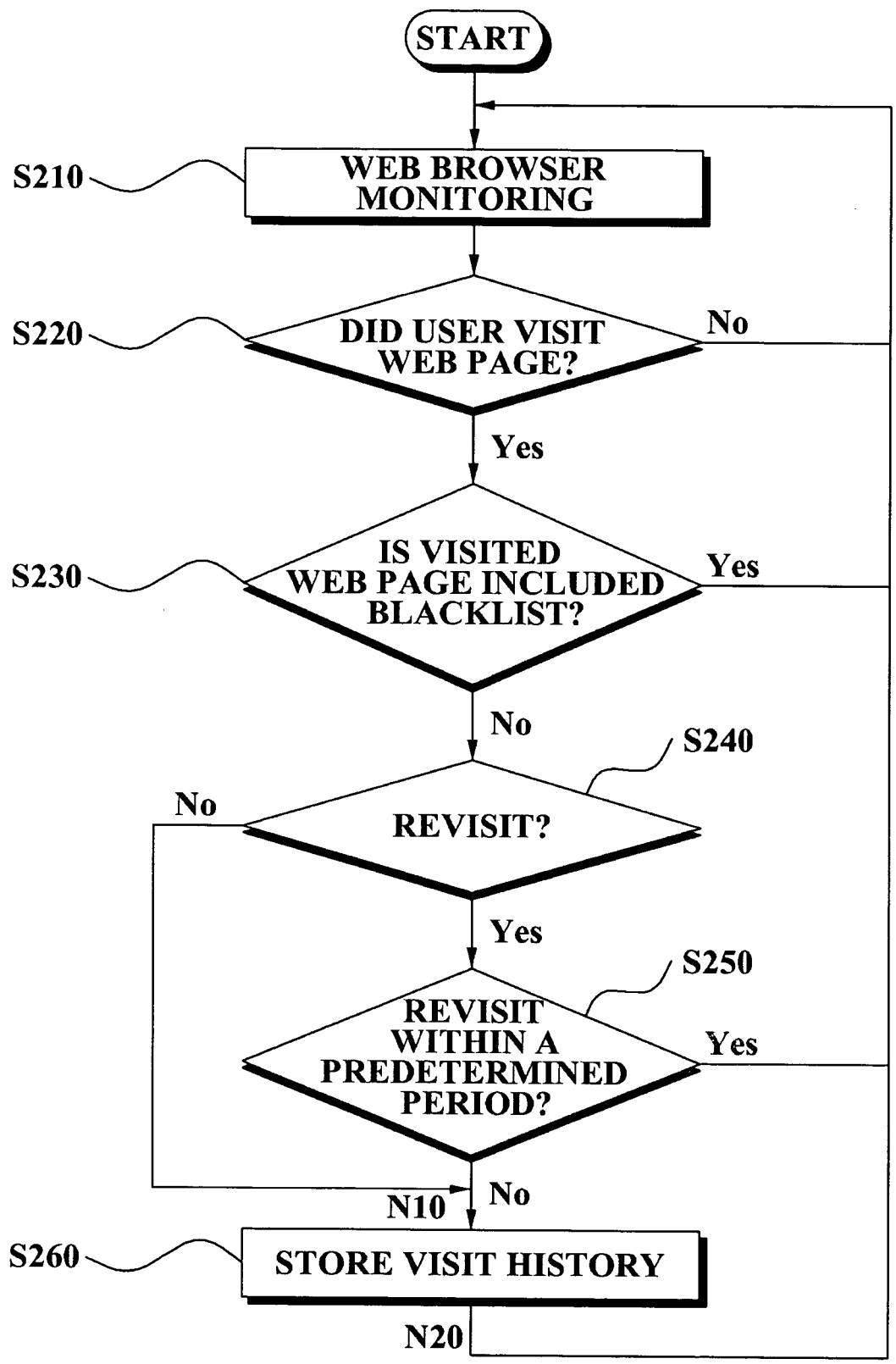
FIG. 2 is a flowchart illustrating operations of the website visit monitoring unit in FIG. 1.

FIG. 2 is a flowchart illustrating operations of the website visit monitoring unit 120 in FIG. 1.

Referring to FIGS. 1 and 2, the website visit monitoring unit 120 monitors an operation of the web browser 110 while the web browser 110 of FIG. 1 is executed, in operation S210.

In this case, the website visit monitoring unit 120 may monitor an address window and a loading page of the web browser 110 of FIG. 1, and the user's operation.

The website visit monitoring unit 120 determines whether the user terminates a web page search or not after visiting the website, as a result of monitoring the web browser 110 of FIG. 1, in operation S220.

The website visit monitoring unit 120 returns to operation S210 to continue monitoring the web browser 110 of FIG. 1 when the user does not terminate the corresponding web page search.

The website visit monitoring unit 120 determines whether the visited web page is included in the blacklist when the user has terminated the corresponding web page search in operation S230.

The website visit monitoring unit 120 returns to operation S210 to continue monitoring the web browser 110 of FIG. 1, when the corresponding web page is included in the blacklist, since the website visit monitoring unit 120 does not store a visit history for the corresponding web page.

The website visit monitoring unit 120 determines whether there is a visit history to the corresponding website when the visited web page is not included in the blacklist in operation S240.

In this case, the determining whether there is a visit history to the corresponding website may be performed by referring to data indexed in the index database 160.

The website visit monitoring unit 120 stores a visit history when it is the first time the user visits the corresponding website in operation S260.

In this case, the visit history may be stored as illustrated in Table 1.

The website visit monitoring unit 120 determines whether the visit is a revisit within a predetermined period when there is a visit history of the corresponding website in operation S250.

The website visit monitoring unit 120 returns to operation S210 to continue monitoring the web browser 110 of FIG. 1 when the visit is a revisit within the predetermined period, without storing the visit history.

The website visit monitoring unit 120 stores the visit history when the visit is a revisit after the predetermined period of time in operation S260.

Figure 3:
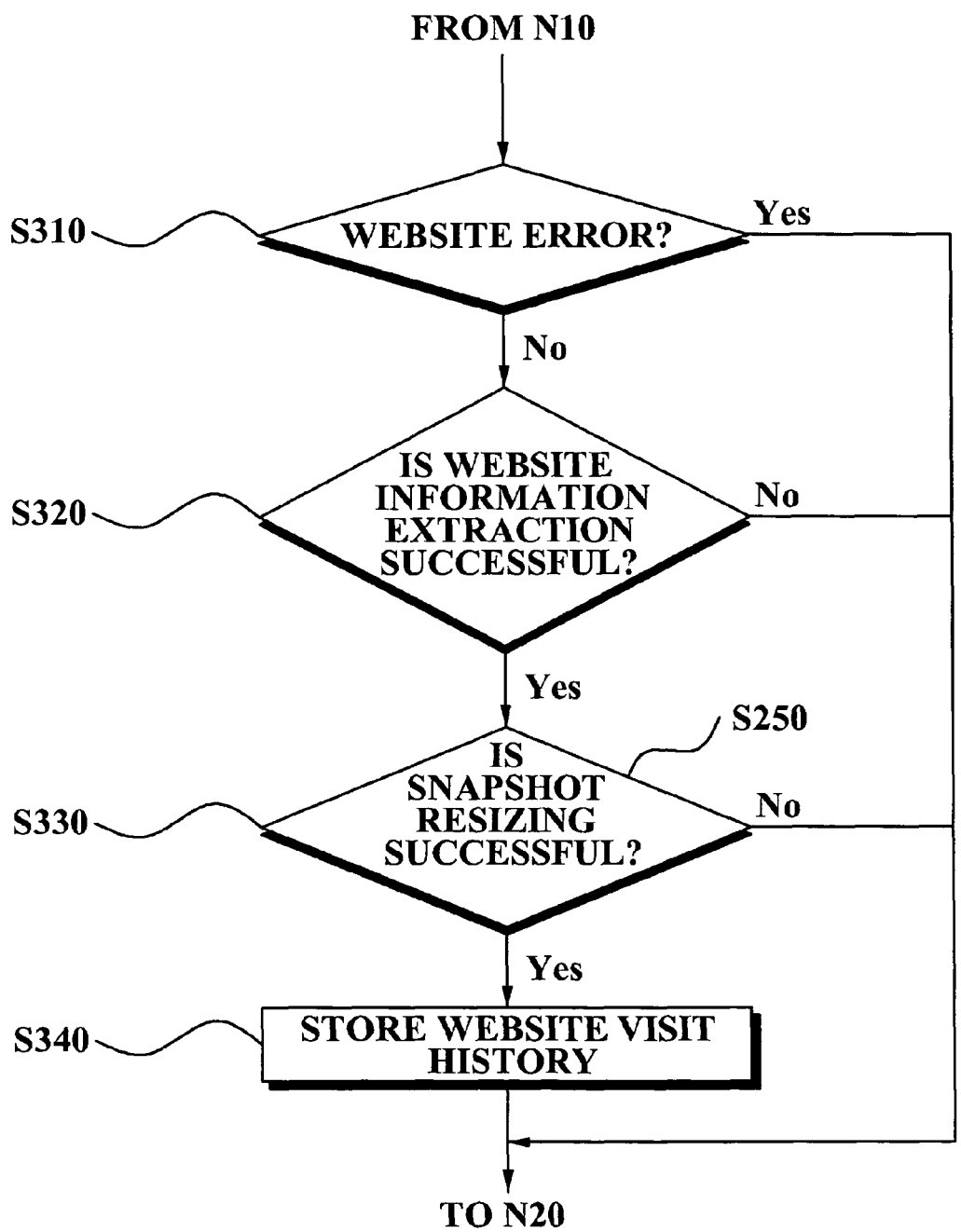
FIG. 3 is a flowchart illustrating an example of the storing of the website visit history in FIG. 2.

FIG. 3 is a flowchart illustrating an example of operation S260 in FIG. 2, i.e. the storing the of website visit history.

Referring to FIG. 3, the storing of the website visit history determines whether there is an error in the visited webpage in operation S310.

The storing of the website visit history repeatedly monitors the web browser 110 of FIG. 1 when there is an error in the visited webpage since the website visit history can not be correctly stored.

The storing of the website visit history determines whether a website information extraction is successful or not when there is no error in the webpage in operation S320.

In this case, the website information extraction indicates extracting desired information by reading a visited website URL, a visited website title, and a text type HTML source, and parsing the visited website URL, the visited website title, and the text type HTML source when required.

The storing of the website visit history determines whether snapshot resizing is successful or not when the website information extraction is successful in operation S330.

In this case, the snapshot resizing indicates generating a thumbnail image of a browser snapshot.

The storing of the website visit history repeatedly monitors the web browser 110 of FIG. 1 when the snapshot resizing is not successful.

The storing of the website visit history stores the website visit history when the snapshot resizing is successful in operation S340.

Referring back to FIG. 1, the mini web server 130 communicates with the web browser 110 according to the HTTP protocol, receives a search command from the web browser 110, and provides the web browser 110 with a search result in the form of a web document. In this case, the mini web server 130 is a type of a web server established in the local computer.

In this case, the mini web server 130 investigates a sending address of the received search command, and provides a service only when the sending address is identical to the local computer address or the loopback address, in which the mini web server is established.

The mini web server 130 may be accessed by the local computer in which the mini web server 130 is established via a loopback interface, and may not be accessed by an external computer via the Internet.

The index unit 140 builds the index database 160 by indexing the data in the website history database 170.

In this case, the index unit 140 may operate using a polling method which accesses the website history database 170 within a predetermined time interval and indexes the website visit history. A visited website search system searching the website visited by the user may be more simply and effectively embodied by the operating of the polling method which accesses the website history database 170 and indexes the website visit history, in comparison to the indexing of the website visit history according to an event which occurs whenever the user visits the website.

As an example, the index unit 140 may index the website visit history by accessing the website history database 170 in approximately one to two seconds intervals, and subsequently, in this case, a load of a system may be reduced in comparison to the indexing of the website visit history whenever the user visits a specific website.

Depending upon an embodiment, the index unit 140 may index the website visit history by initiating an event in the predetermined time interval using an additional timer which is independent from a CPU of the local computer. As described above, a load of the CPU may be reduced by using the CPU and the additional timer.

Also, the index unit 140 may delete an indexed website visit history from the web history database in the website history database 170.

Figure 4:
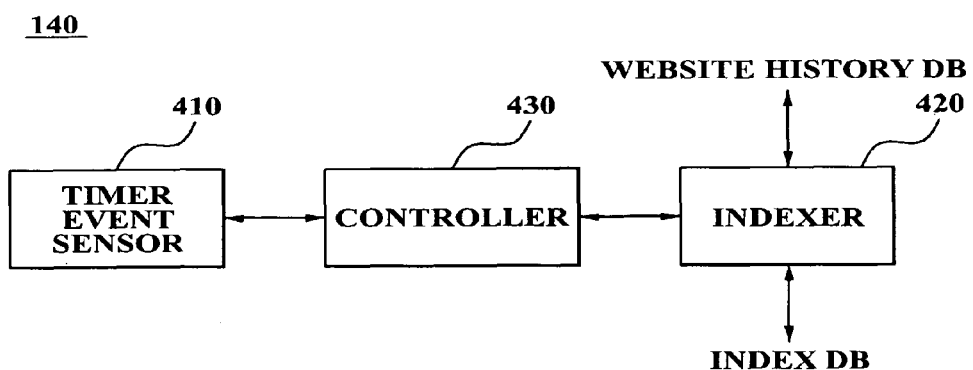
FIG. 4 is a block diagram illustrating an example of an index unit in FIG. 1.

FIG. 4 is a block diagram illustrating an example of the index unit 140 in FIG. 1.

Referring to FIGS. 1 through 4, the index unit 140 includes a timer event sensor 410, an indexer 420 and a controller 430.

The timer sensor 410 senses events, e.g. an overflow, which are generated from a timer included in a CPU chipset. As an example, the timer may be established to generate an overflow every second, and the timer sensor 410 may sense the overflow in every second.

The indexer 420, whenever the timer event sensor 410 senses a predetermined timer event, accesses the website history database 170, indexes the website visit history, extract an index word, and builds the index database 160. In this case, the indexer 420 may delete the indexed website visit history from the website history database 170.

The controller 430 controls the indexer 420 according to the sensing result of the timer sensor 410.

Referring back to FIG. 1, the search unit 151 is provided with the search command from the mini web server 130, and generates a search result using a query included in the search command. A case where the search unit 151 is provided with the search command from the mini web server 130 is illustrated in FIG. 1, also the search unit 151 may be provided with the search command from the web document generation unit 153. In this case, the web document generation unit 153 may be provided with the search command from the mini web server 130.

The web document generation unit 153 transforms the search result into the search result in the form of a web document and generates the web document type search result.

In this case, the web document may be an HTML document. Namely, the web document generation unit 153 transforms the search result which is generated by the search unit 151 into the form of an HTML document, and generates search result in the form of an HTML document. Also, the web document generation unit 153 may generate web documents, e.g. the HTML document, and the like, by adding a required resource for the search result, e.g. an image, a word, and the like.

According to the embodiment, the web document generation unit 153 may be provided with the required resource from the resource component 155, the resource being required for transforming the search result into the web document type.

The resource component 155 may provide the require resource for generating web documents, excluding the web document type search result and the search result. In this case, the web documents, excluding the search result, may be guide documents regarding the visit website search and the web document showing an index state.

The resource component 155 may store various resources, e.g. a language, a font, a character string, and the like, for generating the web documents.

As described above, the visited website search system searching a website visited by a user may stably operate, similar to a conventional art, since communication between the web browser 110 and the mini web server 130 is performed according to the HTTP protocol by providing HTTP functionality to the mini web server 130. Further, in the visited website search system according to the present invention, the collected search result from the mini web server 130, respectively installed in each computer, may be readily collected according to the HTTP protocol when using at least two computers, since the system operates on a basis of a web server.

The embodiment, i.e. the website visit monitoring unit 120, builds the website history database 170, and the index unit 140 indexes information of the user's visited website with respect to the built website history database 170, as described above. However the index unit 140 may directly index the information of the user's visited website from the website visit monitoring unit 120 without the generating of the website history database 170, and may index the information of the user's visited website with respect to a database contained within/outside of the local computer, including the website history database 170.

Figure 5:
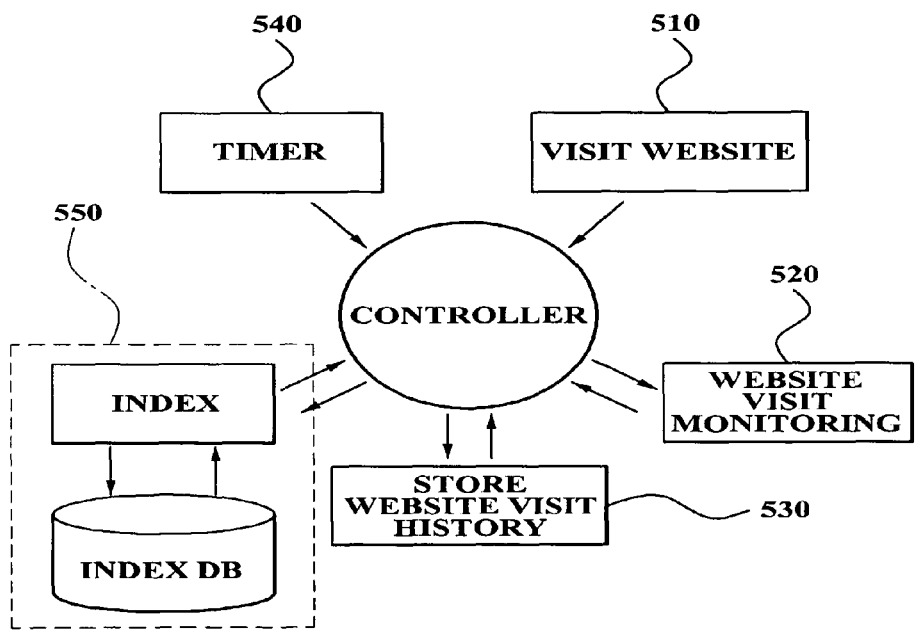
FIG. 5 is a diagram illustrating the indexing operation of the website search system searching a website visited by the user in FIG. 1.

FIG. 5 is a diagram illustrating the indexing operation of the website search system searching a website visited by the user in FIG. 1.

Referring to FIG. 5, in a reference number 510, the user of the visited website search system visits a desired websites via a web browser 110 of FIG. 1.

The website visit monitoring unit 120 of FIG. 1, subordinately operating to the web browser 110 of FIG. 1, monitors the user's website visit (520) via the web browser 110 of FIG. 1.

The website visit monitoring unit 120 of FIG. 1 stores the user's website visit history (530) in the website history database 170 of FIG. 1.

In this case, the website visit monitoring unit 120 of FIG. 1 enables a visit history for a website registered in the blacklist not to be stored. Also, the website visit monitoring unit 120 of FIG. 1 enables a visit history for a website visited by the user within a predetermined time not to be stored.

The website search system of the present invention allows a predetermined event to occur in every predetermined time period (540) by using a timer included in the CPU chipset in the local computer.

As an example, the timer may be established to generate an overflow, i.e. the event, in approximately every one to two seconds.

The timer accesses the website history database 170 in the predetermined time, indexes the website visit history, and builds the index database (550).

Figure 6:
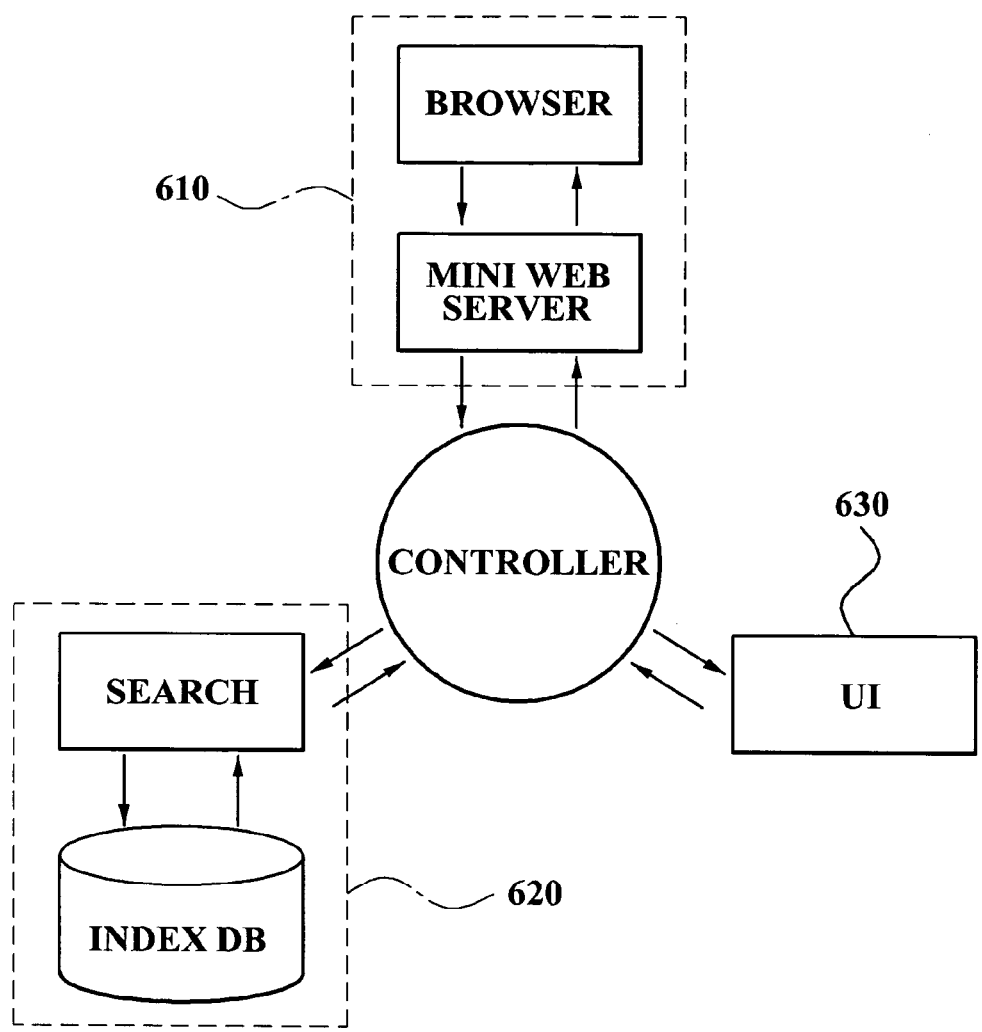
FIG. 6 is a diagram illustrating the searching operation of the website search system searching a website visited by a user in FIG. 1.

FIG. 6 is a diagram illustrating the searching operation of the website search system searching a website visited by a user in FIG. 1.

Referring to FIG. 6, the website search system transmits and receives a search command and a search result in the form of a web document (610) using the HTTP protocol between the web browser and the mini web server 130.

The website search system of the present invention may be readily compatible with a web search system, and a stable visited website search system may be built since communication between the web browser 110 and the mini web server 130 is performed using the mini web server 130, similar to a web search.

The website search system generates a visit website search result by searching an index database using a query included in a search command when the search command from a user is transmitted via the web browser 110 and the mini web server 130 (620).

The website search system generates web documents, e.g. the HTML document, and the like, by adding a required resource for the search result, e.g. an image, a word, and the like, when the visit website search result is generated (630).

The controller illustrated in FIG. 6 is divided for convenience of description of the visited website search system, and may not correspond to a configuration element of the visited website search system in FIGS. 1 through 4.

Figure 7:
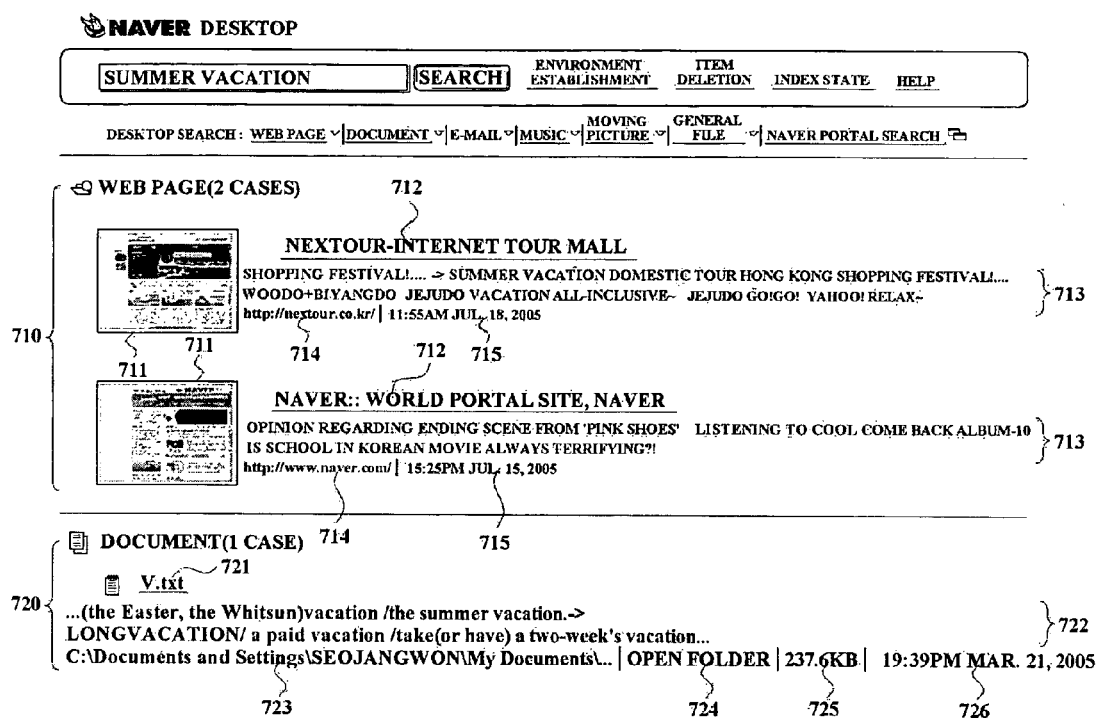
FIG. 7 is a diagram illustrating a search result using the website search system searching a website visited by a user in FIG. 1.

FIG. 7 is a diagram illustrating a search result using the website search system searching a website visited by a user in FIG. 1.

Referring to FIG. 7, as a result of searching using a query "summer vacation", two cases of web pages and one case of a document are retrieved as search results. Accordingly, the website search system according to the present invention may provide the search result with respect to files, e.g. a document, an e-mail, an audio, and a video, stored in a local computer, including the web page search result with respect to the webpage visit history.

As the webpage search result 710, a thumbnail image 711, a website title 712, contents associated with the query 713 among contents in the website, a URL 714, and a date/time 715 are shown. In this case, the thumbnail image 711, the website title 712 and the URL 714 are directly linked to a corresponding website on a present web browser window, or linked to the corresponding website by making a new window when any one is clicked from among the thumbnail image 711, the website title 712 or the URL 714.

In this case, the thumbnail image 711, the website title 712, the contents associated with the query 713 among contents in the website, the URL 714, and the date/time 715 may be data stored in an index database which is generated by indexing important information in the local computer.

As the document search result 720, a file name 721 including an extension of a document, a content 722 associated with a query in document contents, a pathname 723 of a corresponding file, a folder open link 724, storage size information 725, and a date/time 726 are shown. In this case, a corresponding document may be open on the present web browser window, or the corresponding document may be open by executing an application such as a word processor when the file name 721 including the extension of the document is clicked. In this case, a folder containing a corresponding document may be open on the present web browser window, or a folder containing a corresponding document by making a new window may be open when the folder open link 724 is clicked.

In this case, the file name 721 including the extension of the document, the content 722 associated with the query in document contents, the pathname 723 of the corresponding file, the folder open link 724, the storage size information 725, and the date/time 726 may be data stored in the index database which is generated by indexing important information in the local computer.

Figure 8:
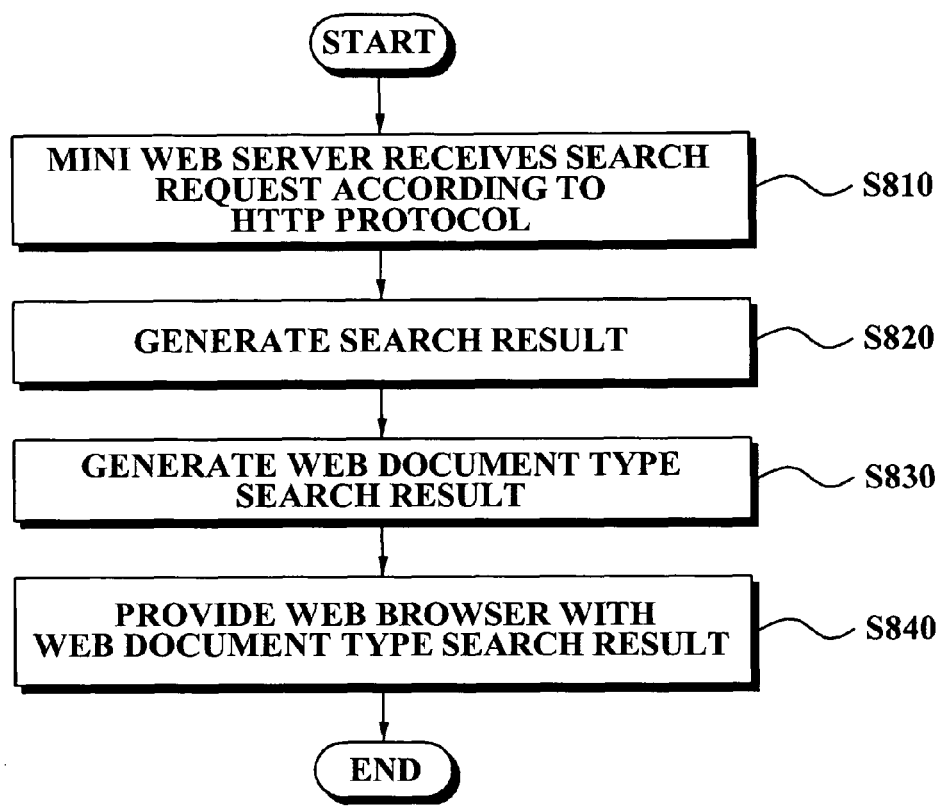
FIG. 8 is a flowchart illustrating a visited website search method searching a website visited by a user according to an exemplary embodiment of the present invention.

FIG. 8 is a flowchart illustrating a visit website search method searching a website visited by a user according to an exemplary embodiment of the present invention.

Referring to FIG. 8, the visit website search method according to an exemplary embodiment of the present invention receives a search command for a website visited by user from a web browser according to the HTTP protocol by a mini web server established in a local computer in operation S810.

In this case, the visit website search method may further include establishing a destination address of the search command as the local computer or a loopback address when it is required to search the website visited by the user from the web browser.

In this case, the mini web server investigates a sending address of the received search command, and provides a service only when the sending address is identical to the local computer address or the loopback address, in which the mini web server is established.

Also, the visit website search method generates a search result by searching a website, corresponding to a query which is included in the search command, among the website visited by user in operation S820.

Also, the visit website search method generates the search result of the web document type by transforming the search result into a form of a web document in operation S830.

In this case, the web document may be an HTML document, and the search result in the form of the web document may be what a required image or phrase is included to the visit website search result.

Also, the visit website search method provides the web browser with the search result in the form of the web document by the mini web browser in operation S840.

Also, the visit website search method further includes collecting a history of the user's website visit by monitoring the user's website visit, and storing the history of the website visit in a website history database, in the website visit monitoring unit which is embodied in a type of a BHO. In this case, the visit website search method further includes generating an index database by indexing data in the website history database, wherein the generating the search result generates the search result by searching the index database using the query.

In this case, the storing of the history of the website visit in the website history database stores a website visit history for the visited website by determining whether the website visited by user corresponds to a previously visited website, when the website visited by user does not correspond to the previously visited website, and stores the website visit history for the visited website only when it passes a predetermined time from the previous visit, when the website visited by user corresponds to the previously visited website.

Also, the storing the history of the website visit in the website history database, in the collecting the website visit history, parses an HTML source of the visited website to extract a text type HTML source, and the website visit history includes at least any one of a visited website URL, a visited website title, the text type HTML source and a thumbnail image of a browser snapshot.

In this case, the generating of the index database may build the index database using a polling method which accesses the website history database within a predetermined time interval and indexes the website visit history. In this case, a CPU and an additional timer which is independent from the CPU of the local computer may be utilized.

Descriptions for FIG. 8 which are analogous to the aforementioned embodiments are not described in the specification for clarity and conciseness.

The visited website search method according to the above-described embodiment of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

The visited website search service system searching a website visited by a user and the visited website search service method using the system operating based on a web server may stably operate according to the HTTP protocol similar to a general website search.

Also, the visited website search service system searching a website visited by a user and the visited website search service method using the system may be capable of being easily compatible with a general web search system by using the HTTP protocol, and has an interface identical with a general web search service.

Also, the visited website search service system searching a website visited by a user and the visited website search service method using the system may easily and effectively collect a user's website visit history by monitoring a web browser using a browser helper object.

Also, the visited website search service system searching a website visited by a user and the visited website search service method using the system may simply index a user's website visit history using a polling method, can reduce a load of a system, and can effectively operate.

Also, the visited website search service system searching a website visited by a user and the visited website search service method using the system may reduce a load of a central processing unit (CPU) of a local computer by operating using an additional timer which is included in a CPU chipset of the local computer when accessing a website history database within a predetermined time.

Also, the visited website search service system searching a website visited by a user and the visited website search service method using the system may reduce indexing and collecting operations with respect to unnecessary information of a visited website since information of a website visited by a user is not updated when the user revisits the website within a predetermined time period.

Also, the visited website search service system searching a website visited by a user and the visited website search service method using the system may be capable of efficiently generating a view by including an additional resource component providing a resource required in generating the view provided to a user via a web browser when a language or a font is changed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A visited website search system to search for a website visited by a user, the system comprising:
   a web browser configured to be executed on a computer used by the user, to receive a search command for results from destinations comprising a website visited by the user and addresses for resources stored on the computer;
   a web site monitoring unit to monitor visits to the website by the user using the web browser, to determine whether the user is revisiting the same website within a determined time, to record, if the user revisits the same website after the determined time elapses, information about the user's revisit in a website visit history database, and not to record information about the user's revisit if the user revisits the same website before the determined time elapses;
   a web server to store, in the website visit history database, information about the resources stored at the addresses on the computer, to receive the search command from the web browser according to a hyper text transfer protocol (HTTP) when at least one destination address of the search command is located on the computer, and to provide the web browser with a web document type search result indicating the resources stored on the computer that are relevant to the search command;

a search unit to generate a first search result by searching, corresponding to a query provided by the search command, the website history visit database for the website visited by the user and for the information about the stored resources; and a web document generation unit to transform the first search result into the web document type search result, wherein the system establishes a destination address of the search command as a computer address or a loopback address if the destination address is needed to search the website visited by the user, wherein the web server investigates a sending address of the received search command, and provides a service if the sending address is identical to the computer address or the loopback address.

2. The system of claim 1, wherein the system is embodied using a browser helper object (BHO).

3. The system of claim 2, wherein the website visit monitoring unit collects a history of the website visited by the user by monitoring the visits to the website by the user, and stores the history of the website visit in the website visit history database.

4. The system of claim 2, further comprising:
an index unit to generate an index database by indexing data in the website visit history database,
wherein the search unit generates the first search result by searching the index database using the query.

5. The system of claim 3, wherein the website visit monitoring unit stores a website visit history for the visited by the user if the website visited by the user does not correspond to a previously-visited website, and stores the website visit history for the visited website if a determined time elapses from a previous visit of the user to the visited website and if the visited website corresponds to the previously-visited website.

6. The system of claim 3, wherein the website visit monitoring unit determines whether the website is registered in a blacklist in response to the user visiting the website, and the website visit monitoring unit stores the website visit history for the website if the website is not registered in the blacklist.

7. The system of claim 6, further comprising:
a blacklist registration unit to register in the blacklist, a website provided by the user.

8. The system of claim 3, wherein the website visit monitoring unit, in collecting the website visit history, parses a hyper text markup language (HTML) source of the website to extract a text type HTML source, and the website visit history comprises at least one of a uniform resource locator (URL) of the website, a title of the website, a text type HTML source, and a thumbnail image of a snapshot of the web browser.

9. The system of claim 4, wherein the index unit deletes indexed data from the website visit history database if data in the website history database is indexed.

10. The system of claim 1, further comprising:
a resource component to provide a resource required for generating the web document type search result,
wherein the resource component provides the web document generation unit with the required resource.

11. The system of claim 4, wherein the index unit accesses the website visit history database and indexes the data in the website visit history database within a time interval.

12. The system of claim 11, wherein the index unit indexes the data in the website visit history database by initiating an event in the time interval using an additional timer independent from a central processing unit (CPU) of the computer.

13. The system of claim 1, further comprising:
an index unit to generate an index database storing index data corresponding to the website visited by the user.

14. The system of claim 13, wherein the search unit searches the index database and generates the first search result using the query.

15. A website visit search method to search for a website visited by user, the method comprising:
receiving, by a web browser configured to be executed on a computer used by the user, a search command for results from destinations comprising a website visited by the user and addresses for resources stored on the computer;
monitoring visits to the website by the user;
determining whether the user revisits the same website within a determined time;
recording, in a website visit history database, information about the user's revisit to the same website if the user revisits the same website after the determined time elapses, and not recording information about the user's revisit if the user revisits the same website before the determined time elapses;
receiving, by a web server, the search command from the web browser according to a hyper text transfer protocol (HTTP) established in the computer if at least one destination address of the search command is located on the computer, and wherein the web server stores, in the website visit history database, information about the resources stored at the addresses on the computer, and provides the web browser with a web document type search result indicating the resources stored on the computer relevant to the search command;
establishing a destination address of the search command as a computer address or a loopback address if the destination address is required to search the website visited by the user;
generating a first search result by retrieving the website, corresponding to a query provided by the search command, from among a history of websites visited by the user and the information about the stored resources, the history of websites being stored in the website visit history database;
generating the web document type search result by transforming the first search result into the web document type search result; and
providing, using the web server, the web browser with the web document type search result,
wherein the web server investigates a sending address of the received search command, and provides a service if the sending address is identical to the computer address or the loopback address.

16. The method of claim 15, further comprising:
collecting the history by monitoring the visits to the website by the user, and storing the history in a website visit history database, the website visit monitoring unit being embodied as a browser helper object (BHO).

17. The method of claim 16, further comprising:
generating an index database by indexing data in the website visit history database,
wherein generating the first search result comprises searching the index database using the query.

18. The method of claim 16, wherein storing the history comprises storing the history for the website visited by the user if the website visited by the user does not correspond to a previously-visited website, and storing the history for the website visited by the user if a determined time from the previous visit is exceeded and if the website visited by the user corresponds to the previously-visited website.

19. The method of claim 17, wherein generating the index database comprises indexing the data in the website visit history database by initiating an event in a time interval using an additional timer independent from a central processing unit (CPU) of the computer.

20. A tangible computer-readable storage medium comprising a program for implementing a website visit search method searching a website visited by a user, the method comprising:

receiving, by a web browser configured to be executed on a computer used by the user, a search command for results from destinations comprising a website visited by the user and addresses for resources stored on the computer;

monitoring visits to the website by the user;

determining whether the user revisits the same website within a determined time;

recording, in a website visit history database, information about the user's revisit to the same website if the user revisits the same website after the determined time elapses, and not recording information about the user's revisit if the user revisits the same website before the determined time elapses;

receiving, by a web server, a search command from the web browser according to a hyper text transfer protocol (HTTP) if at least one destination address of the search command is located on the computer, and wherein the web server stores, in the website visit history database, information about the resources stored at the addresses on the computer, and provides the web browser with a web document type search result indicating resources stored on the computer relevant to the search command;

establishing a destination address of the search command as a computer address or a loopback address if the destination address is required to search the website visited by the user;

generating a first search result by retrieving the website, corresponding to a query provided by the search command, from among a history of websites visited by the user and the information about the resources stored on the computer;

generating the web document type search result by transforming the first search result into a web document type search result; and providing, using the web server, the web document type search result to the web server, wherein the web server investigates a sending address of the received search command, and provides a service if the sending address is identical to the computer address or the loopback address.

* * * * *